(12) United States Patent
Liu

(10) Patent No.: US 9,984,830 B2
(45) Date of Patent: May 29, 2018

(54) VARIABLE CAPACITOR AND METHOD FOR MANUFACTURING THE SAME

(71) Applicant: Mingmei Liu, Changsha (CN)

(72) Inventor: Mingmei Liu, Changsha (CN)

( * ) Notice: Subject to any disclaimer, the term of this patent is extended or adjusted under 35 U.S.C. 154(b) by 0 days. days.

(21) Appl. No.: 15/369,917

(22) Filed: Dec. 6, 2016

(65) Prior Publication Data

US 2017/0125169 A1 May 4, 2017

Related U.S. Application Data

(63) Continuation-in-part of application No. PCT/CN2015/079213, filed on May 18, 2015.

(30) Foreign Application Priority Data

Jun. 6, 2014 (CN) .......................... 2014 1 0249221

(51) Int. Cl.
*H01G 5/16* (2006.01)
*H01G 5/011* (2006.01)

(52) U.S. Cl.
CPC ............... *H01G 5/16* (2013.01); *H01G 5/011* (2013.01)

(58) Field of Classification Search
CPC ................................. H01G 5/16; H01G 5/011
USPC .......................................................... 361/290
See application file for complete search history.

(56) References Cited

U.S. PATENT DOCUMENTS

2010/0001666 A1* 1/2010 Johnson .............. B01F 13/0059
318/116

\* cited by examiner

*Primary Examiner* — Michael P McFadden
(74) *Attorney, Agent, or Firm* — Matthias Scholl, PC; Matthias Scholl

(57) ABSTRACT

A variable capacitor, including: two movable plates, two poles, and one rotary shaft. The two movable plates are conductor belts, and the conductor belts are sheathed in insulators. The two poles are conductors, and each is capable of rotating around an axis thereof. First ends of the two movable plates are connected via the insulators and fixed on the rotary shaft, and second ends of the two movable plates are connected to the two poles, respectively. A conductor member of the two movable plates directly contacts the two poles. The lengths of the two movable plates are identical, and are greater than the distance from one pole to the rotary shaft.

15 Claims, 2 Drawing Sheets

VARIABLE CAPACITOR AND METHOD FOR MANUFACTURING THE SAME

CROSS-REFERENCE TO RELATED APPLICATIONS

This application is a continuation-in-part of International Patent Application No. PCT/CN2015/079213 with an international filing date of May 18, 2015, designating the United States, now pending, and further claims foreign priority benefits to Chinese Patent Application No. 201410249221.2 filed Jun. 6, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a variable capacitor and a method for manufacturing the same.

Description of the Related Art

A variable capacitor is a capacitor whose capacitance can be changed mechanically or electronically. Electronically controlled variable capacitors usually employ power electronic switches to adjust the capacitance values. This results in interference when the power electronic switches are switched on and off. In addition, mechanically controlled variable capacitors often have a large size and a narrow capacitance range.

SUMMARY OF THE INVENTION

In view of the above-described problems, it is one objective of the invention to provide a variable capacitor and a method for manufacturing the same. The variable capacitor has appropriate size and a large capacitance range, and no electromagnetic interfering signal is produced when changing the capacitance value of the variable capacitor.

To achieve the above objective, in accordance with one embodiment of the invention, there is provided a variable capacitor, comprising two movable plates, two poles, and one rotary shaft. The two movable plates are conductor belts. The conductor belts are sheathed in insulators. The two poles are conductors, and each is capable of rotating around an axis thereof. First ends of the two movable plates are connected via the insulators and fixed on the rotary shaft, and second ends of the two movable plates are connected to the two poles, respectively. A conductor member of the two movable plates directly contacts the two poles. Lengths of the two movable plates are identical, and are greater than a distance from one pole to the rotary shaft.

In a class of this embodiment, the conductor member of the two movable plates is made of metal or polymer conductive material.

In a class of this embodiment, the metal is copper, aluminum, tin, or alloy material.

In a class of this embodiment, the conductor member of the two movable plates is in the form of belt or foil.

In a class of this embodiment, the insulators which are sleeved on the two movable plates are made of insulating films, insulating paper, insulating nanomaterial, insulating varnish, or composite insulating material.

In a class of this embodiment, the two movable plates are sheathed in at least one layer of the insulators.

In a class of this embodiment, the two movable plates are soaked in or not soaked in an insulating liquid or an electrolytic solution.

In a class of this embodiment, the capacitor comprises a shell. The two movable plates, the two poles, and the rotary shaft are disposed in the shell. The shell comprises a first button and a second button. The first button is connected to the rotary shaft and drives the rotary shaft to rotate. The first button works to increase a capacitance of the capacitor. The second button is connected to the two poles and simultaneously drives the two poles to rotate at an identical speed. The second button works to decrease the capacitance of the capacitor. A through hole is disposed on the shell. The two poles protrude outside of the shell through the through hole.

A method for manufacturing a variable capacitor, comprising: coating two conductor belts with insulators to form two movable plates; connecting first ends of the two movable plates together via the insulators and fixing the first ends on the rotary shaft; fixing second ends of the two movable plates on two poles, respectively, where the two poles are conductors, and each is capable of rotating around an axis thereof; allowing a conductor member of the two movable plates to directly contact the two poles, where the two poles are used for wiring; and lengths of the two movable plates are identical, and are greater than a distance from one pole to the rotary shaft; rolling or unrolling the conductor belts to change a capacitance of the capacitor.

Advantages of the variable capacitor according to embodiments of the invention are summarized as follows:

The two conductor belts which are connected on the first ends via insulators are used as the plates. In actual operation, the two conductor belts are rolled or unrolled to change the capacitance of the capacitor. Because the conductor belts are rolled, and occupy less space, the capacitor having a continuous capacitance change of more than 10 μF is still small-sized, meanwhile the rated voltage during operation can be high or low by choosing different insulating materials. The capacitor in embodiments of the invention produces no electromagnetic interfering signal, and can be widely applied to circuit fine-tuning, precise filtering, continuous voltage boost or reduction, reactive full compensation, and stepless speed regulation of motor, etc.

BRIEF DESCRIPTION OF THE DRAWINGS

The invention is described hereinbelow with reference to the accompanying drawings, in which.

Figure 1:
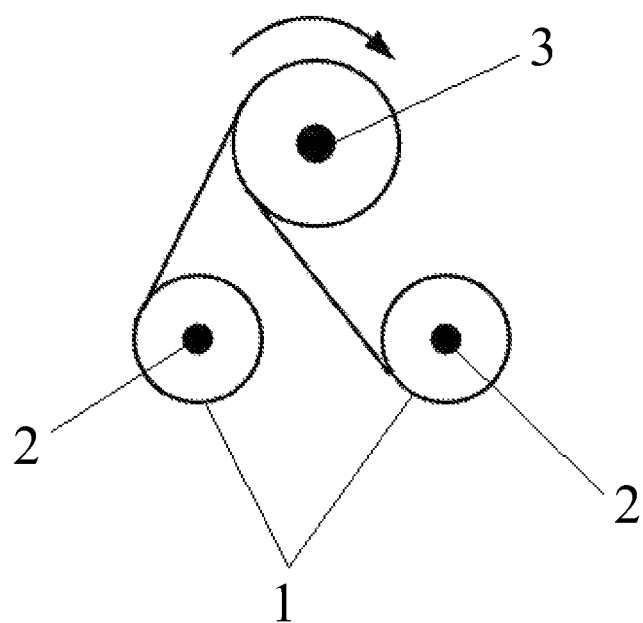
FIG. 1 is a diagram showing how to increase a capacitance of a variable capacitor in accordance with one embodiment of the invention.
Figure 2:
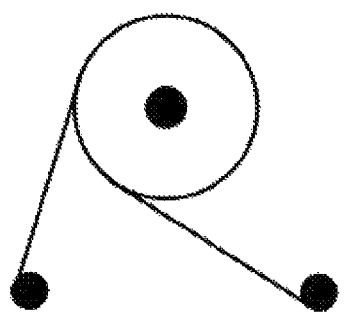
FIG. 2 is a diagram showing a maximum capacitance of a variable capacitor in accordance with one embodiment of the invention.
Figure 3:
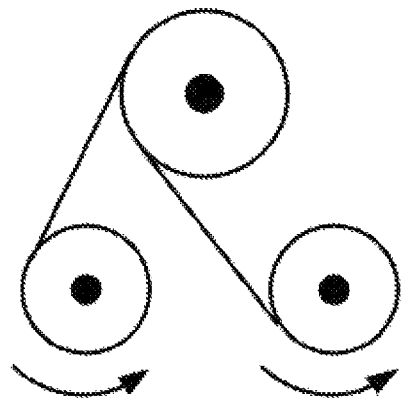
FIG. 3 is a diagram showing how to reduce a capacitance of a variable capacitor in accordance with one embodiment of the invention.
Figure 4:
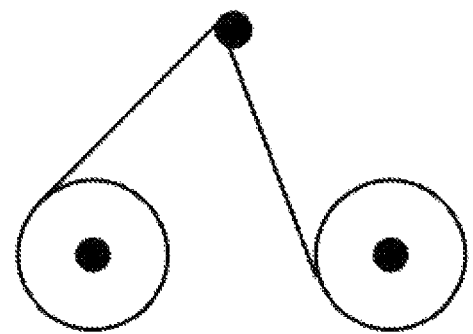
FIG. 4 is a diagram showing a minimum capacitance of a variable capacitor in accordance with one embodiment of the invention.

In the drawings, the following reference numbers are used: 1. Movable plate; 2. Pole; 3. Rotary shaft; 4. First button; 5. Second button; and 6. Through hole.

DETAILED DESCRIPTION OF THE EMBODIMENTS

For further illustrating the invention, experiments detailing a variable capacitor and a method for manufacturing the same are described below. It should be noted that the following examples are intended to describe and not to limit the invention.

As shown in FIGS. 1-4, a variable capacitor comprises two movable plates 1, two poles 2, and one rotary shaft 3. The two movable plates 1 are conductor belts. The conductor belts are sheathed in insulators. The two poles 2 are conductors, and each is capable of rotating around an axis thereof. First ends of the two movable plates 1 are connected via the insulators and fixed on the rotary shaft 3, and second ends of the two movable plates 1 are connected to the two poles 2, respectively. A conductor member of the two movable plates 1 directly contacts the two poles 2. Lengths of the two movable plates 1 are identical, and are greater than a distance from one pole to the rotary shaft 3. The belt-shaped plates are movable. The two plates are partly coincident, or separated to increase or decrease the area between the plates, so as to increase or decrease the capacitance. When the belt-shaped plates are completely coincident, the capacitance is at the maximum. When the plates are completely separated from each other, the capacitance is at the minimum. As the conductor belts are rolled, the capacitor is small-sized. The two plates simultaneously move at the same speed towards the same direction to change the capacitance. To increase the capacitance of the capacitor, the rotary shaft 3 is rotated to drive the two plates to move, and the plates become coincident. To decrease the capacitance of the capacitor, the two poles 2 are simultaneously rotated at the same speed to drive the two plates to move, and the plates are separated. The simultaneous rotation of the two poles 2 is realized by the gear transmission of two or three equal-diameter gears. The two poles 2 are rotated towards the same direction or towards opposite directions. When the two poles are rotated towards the same direction, the winding direction of the plates on the two poles are the same. When the two poles are rotated towards the opposite direction, the winding direction of the plates on the two poles are opposite.

The conductor member of the two movable plates 1 is made of metal. The metal is copper, aluminum, tin, or alloy material. The conductor member of the two movable plates 1 is in the form of belt or foil. By this way, the capacitance variation of the capacitor is optimal.

The insulators which are sleeved on the two movable plates 1 are made of insulating films, insulating paper, insulating nanomaterial, insulating varnish, or composite insulating material. The rated voltage can be high or low by choosing different insulating materials according to needs. The two movable plates 1 are sheathed in at least one layer of the insulators. Different layers of insulators lead to different insulating effect, thus the usage of insulating materials is flexible The plates could be soaked in an insulating liquid, for example completely soaking the plates in the insulating liquid or coating the conductor belts with the insulating liquid, so as to increase the insulating level of the capacitor and reduce the abrasion between the solid insulating materials. When the capacitor uses direct current, the plates are soaked in an electrolytic solution. Due to the ion fluxes in the electrolytic solution, the capacitance of the capacitor is effectively improved.

A method for manufacturing a variable capacitor comprises: coating two conductor belts with insulators to form two movable plates 1; connecting first ends of the two movable plates 1 together via the insulators and fixing the first ends on the rotary shaft 3; fixing second ends of the two movable plates 1 on two poles, respectively, where the two poles are conductors, and each is capable of rotating around an axis thereof; allowing a conductor member of the two movable plates to directly contact the two poles, where the two poles are used for wiring; and lengths of the two movable plates are identical, and are greater than a distance from one pole to the rotary shaft 3; rolling or unrolling the conductor belts to change a capacitance of the capacitor.

Figure 5:
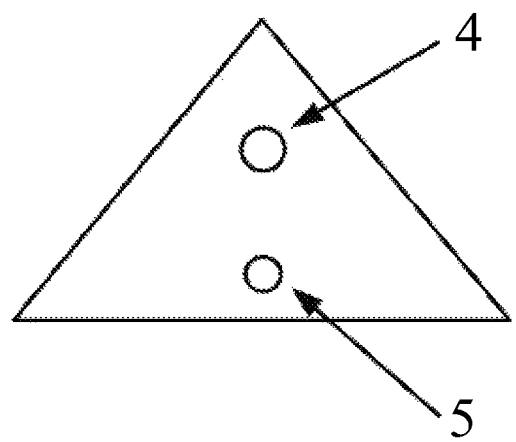
FIG. 5 is a front view of a shell of a variable capacitor in accordance with one embodiment of the invention.
Figure 6:
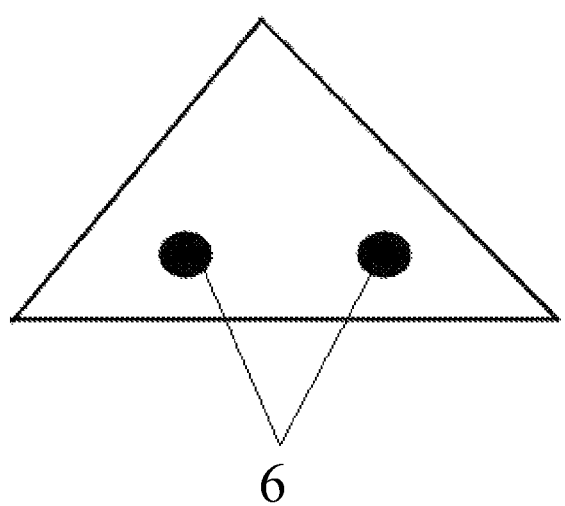
FIG. 6 is a back view of a shell of a variable capacitor in accordance with one embodiment of the invention.

As shown in FIGS. 5-6, in daily use, the capacitor comprises a shell. The two movable plates, the two poles, and the rotary shaft 3 are disposed in the shell. A first button 4 and a second button 5 are disposed on the shell. The first button 4 is connected to the rotary shaft 3 and drives the rotary shaft 3 to rotate, thus the conductor belts are wound onto the rotary shaft 3 from the two poles, and the capacitance of the capacitor is increased. The second button 5 is connected to the two poles through two or three equal-diameter gears, and simultaneously drives the two poles to rotate at an identical speed, thus the conductor belts are wound onto the two poles from the rotary shaft 3, and the capacitance of the capacitor is decreased. A through hole 6 is disposed on the shell. The two poles protrude outside of the shell through the through hole, thus facilitating the wiring.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A variable capacitor, comprising:
two movable plates, the two movable plates being conductor belts;
two poles; and
one rotary shaft;
wherein
the conductor belts are sheathed in insulators;
the two poles are conductors, and each is capable of rotating around an axis thereof;
first ends of the two movable plates are connected via the insulators and fixed on the rotary shaft, and second ends of the two movable plates are connected to the two poles, respectively; a conductor member of the two movable plates directly contacts the two poles; and
lengths of the two movable plates are identical, and are greater than a distance from one pole to the rotary shaft.

2. The capacitor of claim 1, wherein the conductor member of the two movable plates is made of metal or polymer conductive material.

3. The capacitor of claim 2, wherein the metal is copper, aluminum, tin, or alloy material.

4. The capacitor of claim 1, wherein the conductor member of the two movable plates is in the form of belt or foil.

5. The capacitor of claim 1, wherein the insulators are made of insulating films, insulating paper, insulating nanomaterial, insulating varnish, or composite insulating material.

6. The capacitor of claim 1, wherein the two movable plates are sheathed in at least one layer of the insulators.

7. The capacitor of claim 1, wherein the two movable plates are soaked in an insulating liquid or an electrolytic solution.

8. The capacitor of claim 1, wherein the capacitor comprises a shell; the two movable plates, the two poles, and the rotary shaft are disposed in the shell; the shell comprises a first button and a second button; the first button is connected to the rotary shaft and drives the rotary shaft to rotate to increase a capacitance of the capacitor; the second button is connected to the two poles and simultaneously drives the two poles to rotate at an identical speed to decrease the capacitance of the capacitor; a through hole is disposed on the shell; and the two poles protrude outside of the shell through the through hole.

9. The capacitor of claim 2, wherein the capacitor comprises a shell; the two movable plates, the two poles, and the rotary shaft are disposed in the shell; the shell comprises a first button and a second button; the first button is connected to the rotary shaft and drives the rotary shaft to rotate to increase a capacitance of the capacitor; the second button is connected to the two poles and simultaneously drives the two poles to rotate at an identical speed to decrease the capacitance of the capacitor; a through hole is disposed on the shell; and the two poles protrude outside of the shell through the through hole.

10. The capacitor of claim 3, wherein the capacitor comprises a shell; the two movable plates, the two poles, and the rotary shaft are disposed in the shell; the shell comprises a first button and a second button; the first button is connected to the rotary shaft and drives the rotary shaft to rotate to increase a capacitance of the capacitor; the second button is connected to the two poles and simultaneously drives the two poles to rotate at an identical speed to decrease the capacitance of the capacitor; a through hole is disposed on the shell; and the two poles protrude outside of the shell through the through hole.

11. The capacitor of claim 4, wherein the capacitor comprises a shell; the two movable plates, the two poles, and the rotary shaft are disposed in the shell; the shell comprises a first button and a second button; the first button is connected to the rotary shaft and drives the rotary shaft to rotate to increase a capacitance of the capacitor; the second button is connected to the two poles and simultaneously drives the two poles to rotate at an identical speed to decrease the capacitance of the capacitor; a through hole is disposed on the shell; and the two poles protrude outside of the shell through the through hole.

12. The capacitor of claim 5, wherein the capacitor comprises a shell; the two movable plates, the two poles, and the rotary shaft are disposed in the shell; the shell comprises a first button and a second button; the first button is connected to the rotary shaft and drives the rotary shaft to rotate to increase a capacitance of the capacitor; the second button is connected to the two poles and simultaneously drives the two poles to rotate at an identical speed to decrease the capacitance of the capacitor; a through hole is disposed on the shell; and the two poles protrude outside of the shell through the through hole.

13. The capacitor of claim 6, wherein the capacitor comprises a shell; the two movable plates, the two poles, and the rotary shaft are disposed in the shell; the shell comprises a first button and a second button; the first button is connected to the rotary shaft and drives the rotary shaft to rotate to increase a capacitance of the capacitor; the second button is connected to the two poles and simultaneously drives the two poles to rotate at an identical speed to decrease the capacitance of the capacitor; a through hole is disposed on the shell; and the two poles protrude outside of the shell through the through hole.

14. The capacitor of claim 7, wherein the capacitor comprises a shell; the two movable plates, the two poles, and the rotary shaft are disposed in the shell; the shell comprises a first button and a second button; the first button is connected to the rotary shaft and drives the rotary shaft to rotate to increase a capacitance of the capacitor; the second button is connected to the two poles and simultaneously drives the two poles to rotate at an identical speed to decrease the capacitance of the capacitor; a through hole is disposed on the shell; and the two poles protrude outside of the shell through the through hole.

15. A method for manufacturing a variable capacitor, comprising:

coating two conductor belts with insulators to form two movable plates;

connecting first ends of the two movable plates together via the insulators and fixing the first ends on a rotary shaft;

fixing second ends of the two movable plates on two poles, respectively, wherein the two poles are conductors, and each is capable of rotating around an axis thereof;

allowing a conductor member of the two movable plates to directly contact the two poles, wherein the two poles are used for wiring, and lengths of the two movable plates are identical, and are greater than a distance from one pole to the rotary shaft; and rolling or unrolling the conductor belts to change a capacitance of the capacitor.

\* \* \* \* \*